(12) United States Patent
Liu

(10) Patent No.: US 9,129,339 B2
(45) Date of Patent: Sep. 8, 2015

(54) DIGITAL CURRENCY PURCHASING FLOWS

(75) Inventor: Deborah Liu, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 49 days.

(21) Appl. No.: 13/619,623

(22) Filed: Sep. 14, 2012

(65) Prior Publication Data

US 2013/0103526 A1 Apr. 25, 2013

Related U.S. Application Data

(62) Division of application No. 13/276,955, filed on Oct. 19, 2011.

(51) Int. Cl.
| | | |
|---|---|---|
| *G06Q 30/00* | (2012.01) | |
| *G06Q 40/00* | (2012.01) | |
| *G06Q 30/06* | (2012.01) | |
| *G06Q 50/00* | (2012.01) | |

(52) U.S. Cl.
CPC ............... *G06Q 40/00* (2013.01); *G06Q 30/06* (2013.01); *G06Q 50/01* (2013.01)

(58) Field of Classification Search
USPC ............................................... 705/26.1–27.2
See application file for complete search history.

(56) References Cited

U.S. PATENT DOCUMENTS

| | | | | |
|---|---|---|---|---|
| 8,140,403 | B2* | 3/2012 | Ramalingam et al. | 705/26.1 |
| 2011/0082772 | A1* | 4/2011 | Hirson | 705/27.1 |
| 2013/0046634 | A1* | 2/2013 | Grigg et al. | 705/14.58 |
| 2013/0073363 | A1* | 3/2013 | Boal | 705/14.23 |
| 2013/0110666 | A1* | 5/2013 | Aubrey | 705/26.5 |

OTHER PUBLICATIONS

Hirsch, R., Coratella, A., Felder, M., & Rodriguez, E. (2001). A framework for analyzing mobile transaction models. Journal of Database Management, 12(3), 36-47. Retrieved from http://search.proquest.com/docview/199598693?accountid=14753.*
United States Office Action, U.S. Appl. No. 13/276,955, Aug. 25, 2014, six pages.

* cited by examiner

*Primary Examiner* — Kathleen G Palavecino
(74) *Attorney, Agent, or Firm* — Fenwick & West LLP

(57) ABSTRACT

A social networking system leverages information obtained regarding user interactions with applications hosted through the social networking system as well as information obtained regarding purchases of application-related digital items and digital currencies to provide insight into user behavior. The social networking system can use these insights to enhance the user's experience of the applications, purchases, and the social networking system generally. For example, the social networking system can customize transaction flows, provide credit referrals, and provide users with aggregated yet personally tailored sales information.

22 Claims, 5 Drawing Sheets

DIGITAL CURRENCY PURCHASING FLOWS

This application is a divisional of U.S. patent application Ser. No. 13/276,955, filed on Oct. 19, 2011, entitled "Digital Currency Purchasing Flows," which is incorporated herein by reference in its entirety.

BACKGROUND

This invention relates generally to social networking, and in particular to credit transactions systems integrated into social networking systems.

Social networking systems have become prevalent in recent years because they provide a useful environment in which users can connect to and communicate with other users. A variety of different types of social networking systems exist that provide mechanisms allowing users to interact within their social networks. Social networks are particularly adept at organizing incoming social information and displaying the most relevant pieces of information to a user.

In addition to providing connections and communications between users, social networking systems have evolved into platforms for accessing and interacting with different types of applications provided by third parties. For example, many computer games exist that are hosted by third parties and that interface with and through the social networking system so that users of the social networking system may share in gameplay and socialize regarding their in-game actions. Some third party game providers sell digital goods in exchange for real-world currency, where the digital goods can be used as part of gameplay. In order to unify the user experience for social networking systems and the applications integrated within them, social networking systems have implemented unified digital currencies that may be used in any of the applications integrated with the social networking system.

Existing social networking systems, however, have not been able to leverage information regarding user's transactions and application use, particularly between applications hosted by different parties or between users, in any meaningful way.

SUMMARY

A social networking system leverages information obtained regarding user interactions with applications hosted through the social networking system as well as information obtained regarding purchases of application-related digital items and digital currencies to provide insight into user behavior. The social networking system can use these insights to enhance the user's experience of the applications, purchases, and the social networking system generally.

In one embodiment, the information is used to personalize the flow of transactions for the purchase of in-application items or digital currencies to the user's level of experience regarding digital currencies. For less experienced users, the costs of items may be displayed in real-world currencies rather than digital currency, the user may be provided with more instruction for how to perform a purchase, and the user may be provided more opportunities to confirm or opt out of a transaction. Alternatively, for experienced users who are more interested in completing the transaction quickly, the transaction flow may be tailored to streamline the process to avoid burdening the users with choices that the social networking system predicts will be affirmed anyway. This streamlined experience may even be provided the first time a user purchases an item for a given application, since the social networking system may determine that the users are experienced based on their previous transaction or application use from other applications associated with the social networking system.

In another embodiment, the social networking system uses the information to offer digital currency referral services as a reward to purchasers of digital currencies. For example, if two friends are active game players of different games hosted through the social networking system, whenever one friend purchases an in-game item, they may be provided with the opportunity of giving a few credits for free to their friend to encourage them to join them in the play of the same game. The social networking system is capable of obtaining information about application interactions and purchases across multiple applications, and therefore the credit referrals can be used by third party application providers to cross-sell their applications to users who have shown a willingness to obtain and spend digital currency and who might be interested in their application.

In another embodiment, the social networking system aggregates the received digital currency transaction information to provide users with targeted information about what types of digital items are available for purchase, where they can be obtained, and how much the user can expect to pay for them. Which digital items are provided to users may be determined by aggregating digital currency transaction information from other users they are connected to, directly or indirectly, within the social networking system. For example, it may be suggested to the user that a sale is currently being held for a particular digital item, and that so far 500 people they are associated with have purchased the item at the sale price.

DETAILED DESCRIPTION

Overview of a Social Networking System Network

Figure 1:
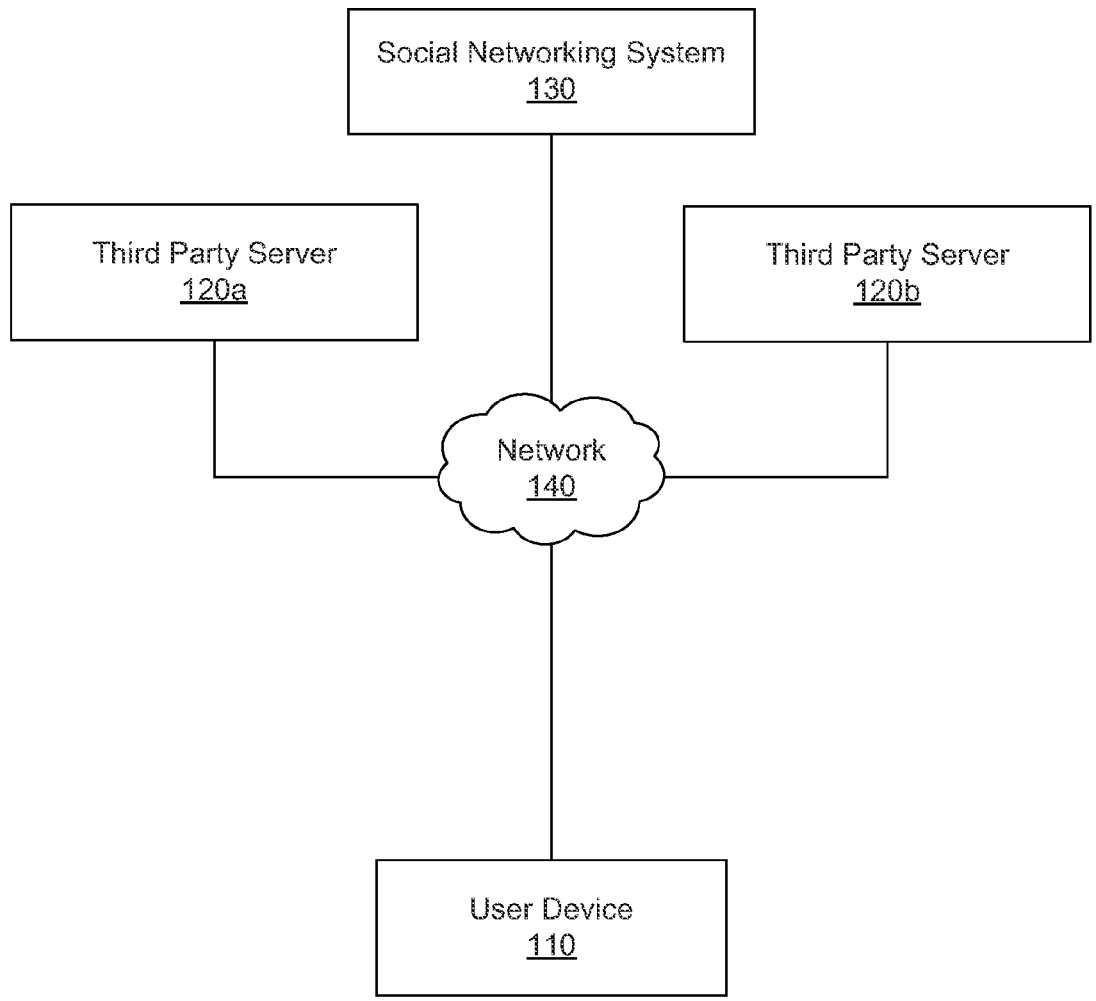
FIG. 1 is a network diagram of one embodiment of a system for providing a user with a social networking system as well as games that interface with the social networking system but are hosted by third parties outside of the social networking system.

FIG. 1 is a network diagram of one embodiment of a system for providing a user with a social networking system as well as applications that interface with the social networking system but are hosted by third parties. The system 100 includes one or more user devices 110, the social networking system 130, third party servers 120, and a network 140. For purposes of illustration, the embodiment of the system 100 shown by FIG. 1 includes a single user device 110 and two different third party servers 120a and 120b. However, in other embodiments, the system 100 may include more user devices 110 and/or more or less third party servers 120. The social networking system 130 provides a platform, or backbone, which other systems may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 140, which may comprise any combination of local area and/or wide area networks, using both wired and wireless communication systems. In one embodiment, the user device 110 displays content from the social networking system 130.

The social networking system 130 comprises one or more computing devices storing a social network, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

The social networking system 130 is also capable of linking a variety of entities. For example, the social networking system 130 enables users to interact with each other as well as with applications hosted remotely by third-party servers 120 or other entities, or to allow users to interact with these entities through an API or other communication channels. In addition to establishing and maintaining connections between users and allowing interactions between users, the social networking system 130 provides users with the ability to take actions on various types of information stored in the social networking system 130.

Interfacing with applications hosted by third party servers 120 allows users to interact with the social networking system 130 while also interacting with applications provided by the third party server 120 in the same user interface. By interacting with the social networking system, these applications may provide social functionality by incorporating features from the social networking system that they interface with. One example of applications provided by third party servers 120 includes online games that are played by users of the social networking system 130 within the interface of the social networking system 130. This interconnecting (or interfacing) between the game provided by third party servers and the social networking system 130 allows users to connect their in-game, or more generally in-application, activities to their social network activities, such that the two can affect each other. For example, activities that occur in-application can be represented as social information for the user in the social networking system, and in the reverse social information of the user can be used as an input to the application thereby affecting the behavior of the application (e.g., affecting gameplay).

The functionality that is provided by applications hosted by the third party servers 120 may also be provided by applications hosted at the social networking system instead, either on the same server, by the same company, within the same network. The applications may also be built into the social networking system 130 itself.

Social Networking System Architecture

Figure 2:
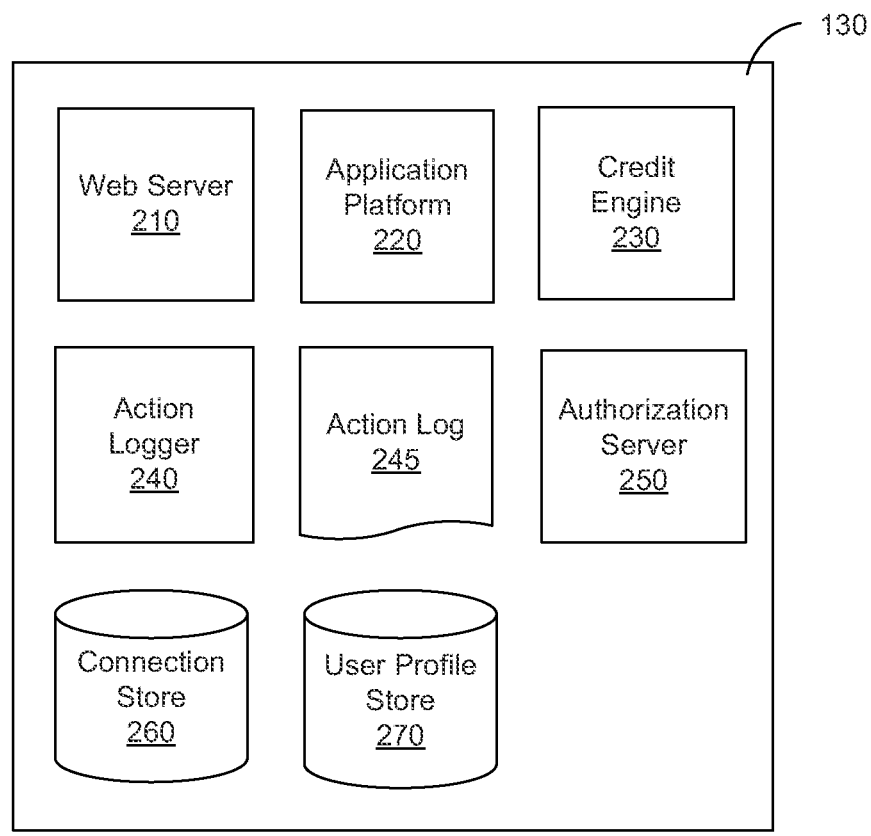
FIG. 2 is a diagram of a social networking system, in accordance with an embodiment of the invention.

FIG. 2 is a diagram of one embodiment of a social networking system 130. The embodiment of a social networking system 130 shown by FIG. 2 includes a web server 210, an action logger 240, an action log 245, an authorization server 250, a user profile store 270, a connection store 260, an application platform 220, and a credit engine 230. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 allows users to communicate or otherwise interact with each other and access content as described herein. The social networking system 130 stores user profiles describing the users of a social network in a user profile store 270. The user profiles include biographic, demographic, and other types of descriptive information, such as work experience, educational history, hobbies or preferences, interests, location, and the like. For example, the user profile store 270 contains data structures with fields suitable for describing a user's profile. When a new information item of a particular type is created, the social networking system 130 initializes a new data structure, i.e., a "node" of the corresponding type, assigns a unique identifier to it, and begins to add data to it as needed. This might occur, for example, when a user becomes a user of the social networking system 130, the social networking system 130 generates a new instance of a user profile in the user profile store 270, assigns a unique identifier to the user profile, and begins to populate the fields of the user profile with information provided by the user.

In addition, the user profile store 270 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 270 includes logic for maintaining user interest information for users according to one or more categories. Categories may be general or specific, e.g., if a user "likes" an article about a brand of shoes the category may be the brand, or the general category of "shoes" or "clothing." Multiple categories may apply to a single user interest. In addition, the user profile store 270 may be accessed by other aspects of the social networking system 130.

The social networking system 130 further stores data describing one or more connections between different users in a user connection store 260. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 260 includes data structures suitable for describing a user's connections to other users, connections to third-party servers 120, or connections to other entities. The connection stores 260 may also associate a connection type with a user's connections, which may be used in conjunction with the user's privacy setting, to regulate access to information about the user. In addition, the connection store 260 may be accessed by other aspects of the social networking system 130.

The web server 210 links the social networking system to one or more user devices 110 via the network 140. The web server 210 serves web pages, as well as other web-related content, such as Java, Flash, XML, and so forth. The web server 210 may include a notification and/or mail server or other messaging functionality for receiving and routing messages between the social networking system 130 and one or more user devices 110. The messages can be instant messages, queued messages (e.g., email), text and SMS messages, or any other suitable messaging format.

Application platform 220 links the social networking system 130 to one or more third party servers 120 via the network 140. The third party servers 120 host applications that interface with the social networking system 130. The application platform provides the mechanism for that interaction including, for example, APIs for interfacing the applications with the social networking system. For example, the APIs may include mechanisms for interacting with a user's profile, or for retrieving their transaction history, for processing a transaction request, and/or for transmitting data regarding in-application behavior by the user to the social networking system 130. Through the action logger 240 and action log 245 described immediately below, the application platform communicates with the third party servers 120 to retrieve and store information associated with the user's interactions and use of applications.

The action logger 240 is capable of receiving communications from the web server 210 about user actions on and/or off the social networking system 130. The action logger 240 populates the action log 245 with information about user actions, allowing the social networking system 130 to track or monitor various actions taken by its users within the social networking system 130 and outside of the social networking system 130. Any action that a particular user takes with respect to another user is associated with each user's profile, through information maintained in the action log 245 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in the action log 245. In one embodiment, the social networking system maintains the action log 245 as a database of entries. When an action is taken within the social networking system 130, an entry for the action is added to the action log 245.

The authorization server 250 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content, groups, events, messages, concepts, and any other thing that can be represented by the social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 260, the user profile store 270 and the action log 245 allows the social networking system 130 to generate a social graph that uses nodes to identify various information items and edges connecting nodes to identify relationships between different items of information. An edge between two nodes in the social graph represents a particular kind of connection between the two nodes, which may result from an action that was performed by one of the nodes on the other node.

Any information stored or represented by the social networking system may be characterized generally as information items. Information items may include, for example, user profile information, relationship information, recent or upcoming activity information, etc. A few specific examples include major life events such as graduation, marriage, or the birth of a child, as well as minor events such as changes in user location, check-ins, comments on other items in the social networking system, tags to photos and other day to day occurrences. These are just a few examples of the information items upon which a user may act on a social networking system, and many others are possible.

With respect to user profile information, further examples include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Information items may also be added to the social networking system 130 by a third-party through a "communication channel," such as a newsfeed or stream.

The credit engine 230 provides a mechanism for allowing digital transactions for the purchase of general and application specific digital features and items (referred to as "digital items" generally). For users of the social networking system, the credit engine 230 maintains credit balance information indicating the amount of currency available to the user to purchase digital items. Additionally, the credit engine 230 may store access to a user's checking or savings account with institutions such as a bank to allow greater access to currency for purchase of items. The available currency may include a number of different types of currencies in real-world currency denominations (e.g., dollar or euro), as well as digital currencies. The credit engine 230 further allows the purchase of digital currencies using real-world currencies.

The credit engine 230 also provides for the storage of a user's transaction history for the items they have purchased through the credit engine 230 and the social networking system 130. This activity can be received and stored in conjunction with the action logger 240, the action log 245, and a user's profile. In addition to storing individual user's transaction information, the credit engine may work in conjunction with the other aspects of the social networking system to provide a user interface for digital item transactions, where the user interface and the flow of the transaction more generally may change depending upon the user's previous transaction and application experience. Further, the credit engine 230 is configured to aggregate and process generalized sales information to provide a particular user with customized information about digital items for sale. In conjunction with the user profile store 270, the credit engine is configured to provide bonus credit referrals to a user who is purchasing digital currency.

Digital Currency Purchasing Flows

The social networking system 130 leverages user interactions with applications interfacing with the social networking system, application-related digital item transactions, and user profile information to enhance the user's experience. In one implementation, the social networking system uses the information to alter the flow of transactions for digital currency or application-related digital items. For experienced users, this streamlines the transaction experience by removing unnecessary interactions. Alternatively, for newer users the social networking system can more deliberate step through the purchase, e.g., by providing additional educational detail to help the user understand digital currencies and in-application items as well as where their money is going. Tailoring the transaction flow to the level of experience of the user will increase new user trust in the security of the system, while over time remove redundancy the user already understands and accepts.

As a result, altering transaction flow based on user interaction and transaction information minimizes the need for independent user education regarding digital currencies and their method of operation. For example, if users have used one application, they can be ensured that the purchasing system works similarly with other applications. Further, once they have used an application, for example, a few times, they will not need to be constantly reminded of purchasing instructions. This increases the trust and goodwill users will have for digital currency systems, which will help increase their adoption. This also minimizes the need for individual third party applications providers to implement individual currency systems and transaction systems or explain to uses how they work.

The interaction, transaction, and user profile information can also be used to provide additional services and benefits to users. In one implementation, when a user is purchasing virtual currency, the information can be used to determine other friends of the user who have revealed preferences for applications and in-application purchases, e.g., through their application use and transaction information. This information can be used to provide the user with the option of rewarding their friends with credits, in addition to those they are purchasing in the transaction. These rewards may be given by the user as gifts to their friends to encourage them to, for example, play a new game and purchase game related digital items.

In another implementation, the information can be used to provide a user with up to date information about what kinds of application related digital items other groups of users are purchasing. This sales data can be obtained by aggregating application and transaction information for users who are connected, directly or indirectly, with the user. The sales data is anonymous in that it represents the aggregated purchase preferences of groups of users rather than individual users. The sales data can be tailored to the user's individual interests based on their application use.

The social networking system receives information about application use for application that are hosted by third parties and that interface with the social networking system. The social networking system is able to receive this information from multiple different applications independent of whether the applications are entirely hosted within the social networking system itself, or whether the applications are hosted by external third parties, which then interface with the social networking system. The social networking system also receives information about any transactions that users have conducted to purchase virtual currency, or to purchase application related digital items using either digital or real world currency. Transactions information can similarly be obtained directly by the social networking system, or indirectly from the applications interfacing with the social networking system.

Transaction Flow Alteration

Figure 3:
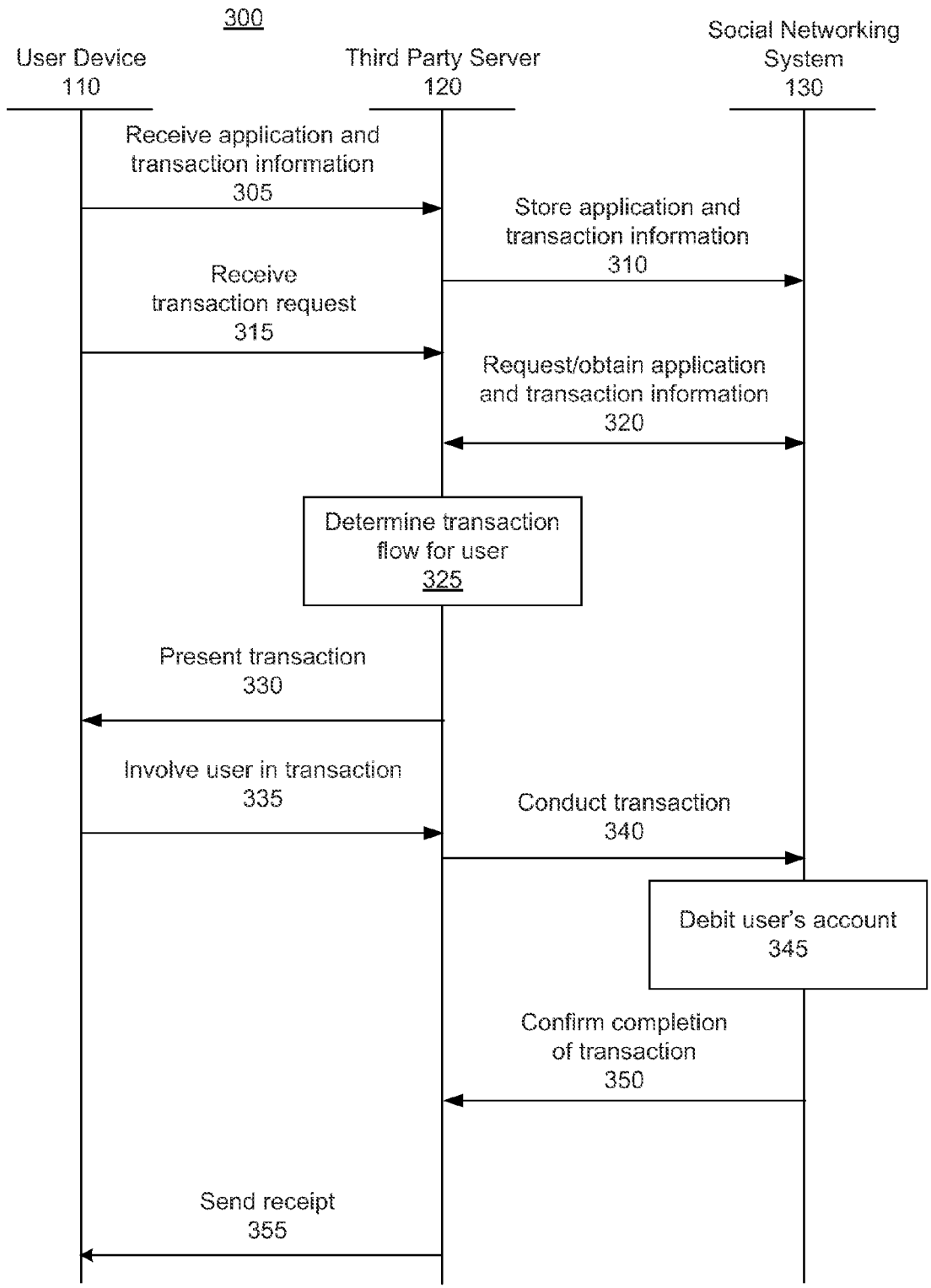
FIG. 3 is an interaction diagram illustrating a process for altering a transaction flow for the purchase of a application related digital item using a virtual currency, according to one embodiment.

FIG. 3 illustrates an interaction diagram for altering a transaction flow for the purchase of an application related digital item using a virtual currency, according to one embodiment. A social networking system 130 interfaces with one or more applications. These applications may be hosted by the social networking system 130 itself or they may be hosted by third party servers 120. Users of the social networking system 130 interact with the social networking system 130 and the applications 120 through user devices 110.

As users make use of the applications, the third party servers 120 receive 305 information regarding the user's interactions and transactions regarding the application. For example, if the user is playing a game such as FARMVILLE, the user's gameplay may be transmitted to the third party server 120. Whenever the user accomplishes something, for example planting a new field of vegetables, the third party server 120 is notified of the user's accomplishment. The third party server 120 also receives 305 information regarding the user's purchase of application related digital items. For example, if the user purchases a tractor in FARMVILLE using digital currency, the third party server 120 hosting the game receives this information. The third party server 120 sends 310 the transaction and application use information to the social networking system 130. The social networking system stores 310 the information.

At any time, the third party server 120 may receive 315 a transaction request from the user. The transaction request indicate the user's intent to purchase an application related digital item. The third party server 120 may alter the flow of the digital item purchase transaction in order to improve the experience of the user. For example, the flow may be altered to be less cumbersome if the user is more experienced, or more educational if the user is less experienced.

In order to determine what transaction flow to provide to the user, the third party server 120 communicates with the social networking system 130 to obtain 320 application use and transaction information for the user. The obtained 320 information is compiled and analyzed to determine a user's competency level with digital currencies and the purchase of application related digital items. The obtained 320 information may include the user's familiarity with applications as indicated by the amount of time spent using applications generally, the number of application used, or other metrics. The obtained 320 information may further include digital item transaction information, including the number of items purchased, prices paid, frequency of purchases, gifts purchased for other users, whether digital currency or real-world currency was used, along with other purchase metrics.

In some cases, the obtained 320 information may also include user profile information that may be relevant to the purchase. For example, if the transaction in question is the purchase of a gift for another user who is connected to the user in the social networking system 130, the transaction flow may take this into account by altering the price of the item, or providing explanatory information for how the gift will be provided or presented to the receiving user when the transaction is completed.

Using the obtained 320 information, the third party server 320 determines 325 a transaction flow for the user based on a user's competency with digital currencies and application related digital item purchases. In an alternative embodiment, rather than sending the third party server 120 the user's application and transaction information, the social networking system 130 may determine a user's competency with digital currencies and application related digital item purchases and use the competency to determine a transaction flow for the user. The transaction flow may then be communicated to the third party server 120 in place of transmitting 320 the underlying information used to make the determination.

If the obtained 320 information indicates that the user has comparatively little competency with digital transactions and items, the transaction flow includes additional explanatory material to increase the user's comfort level with digital transactions. In one embodiment, the transaction flow will display the cost of the digital item in real-world currency first and/or more prominently than the item's cost in digital currency. Additionally, the user may be presented with the choice of purchasing the item in real-world currency or digital currency, as well as provided the option to purchase digital currency. The user may additionally be presented with explanatory information explaining the function and use of digital currency. In one embodiment, transaction flow will include additional steps providing the user with additional opportunities to confirm or back out of the transaction. For example, the user may be presented 330 with the details of the transaction clearly laid out one additional time. The third party server 120 will then wait for the user's confirmation 335 of the transaction to be received before proceeding with carrying out and completing the transaction.

If the obtained 320 information indicates that the user has comparatively greater competency with digital transactions and items, the transaction flow will include less explanation and require less confirmation by the user, such that the transaction may be completed with little to no input from the user once they have initiated the transaction. In this transaction flow, having received 315 the transaction request from the user, the transaction may be conducted requiring only one or zero confirmations from the user to conduct the transaction. In one embodiment, the cost of digital items is presented in digital currency first and/or more prominently than the real-world currency cost equivalent. In one embodiment, it is presumed that the user wishes to purchase items with digital currency unless otherwise indicated, or so long as the user still has digital currency available to debit from.

Assuming the user indicates a desire to proceed with the transaction, for example by initiating the transaction and/or by confirming it, the third party server 120 communicates with social networking system 130 to conduct 340 the transaction. The social networking system 130 debits 345 the user's account the cost of the transaction. The social networking system 130 debits the user's digital currency or real-world currency account depending upon the transaction flow and any received user choice 335. The social networking system 130 communicates the completion 350 of the transaction to the third party server 120, which in turn provides a receipt 355 to the user regarding the completion of the transaction.

Credit Referrals

When a user is purchasing digital currency, the user may be provided with the option of rewarding their friends with bonus credits in addition to those they are purchasing in the transaction. These rewards may be given by the user as gifts to their friends to encourage them to become engaged with the applications interfacing with the social networking system and digital currencies.

Figure 4:
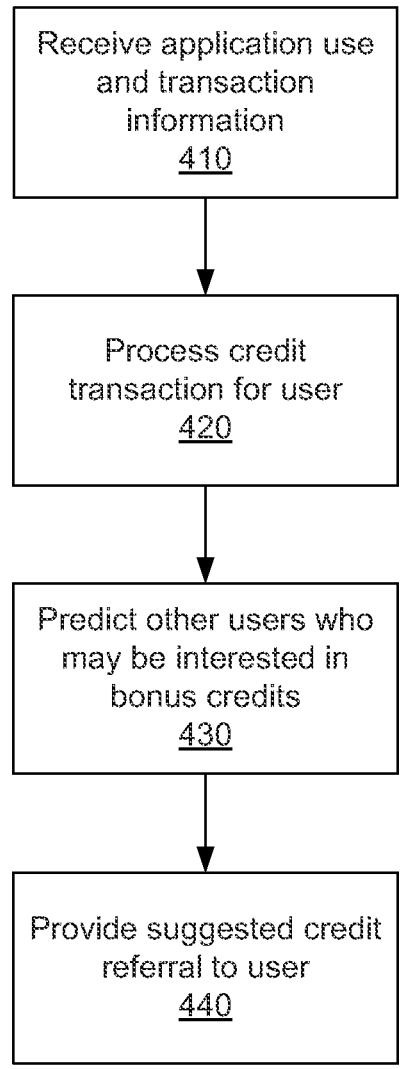
FIG. 4 is a flowchart of a process for providing digital currency referrals to users connected through a social networking system, according to one embodiment.

FIG. 4 is a flowchart for providing digital currency referrals to users connected through a social networking system, according to one embodiment. The social networking system 130 receives and stores 410 digital currency transaction information for users of the social networking system 130. The digital currency transaction information includes purchases of application related digital items. The social networking system 130 also receives and stores users' interactions with the applications associated with the social networking system.

At any time, a user of the social networking system may make a request 420 to purchase a digital item. This request may be made through the third party server 120 or through the social networking system 130 directly. The digital item to be purchased may be associated with an application hosted by the third party server, or may be a digital item that may be used in conjunction with the social networking system directly, for example a customized color avatar or gift type item. The social networking system processes 420 the digital item transaction request. As described above, the processing of the digital item transaction request may incorporate altering the transaction flow in to incorporate the users' competency with digital item and digital currency transactions.

The social networking system 130 uses previously received digital item transaction information to predict which other users of the social networking system are likely to buy additional digital currency if they are provided with bonus credits as a result of the user's digital currency transaction 420. The prediction as to which users are likely to buy additional credits if rewarded bonus credits may be based on the level of connectedness or the degree of separation between the users who will be receiving the bonus credits and the original purchasing user. The degree of separation may be determined between any two users of the social networking system 130 by analyzing the user profile of the purchasing user and determining the degree of connectedness between the purchasing user and another user. For example, if two users are indicated as friends, then there would only be one degree of separation between the two. If the two were indirectly connected by one or more other users, then the degree of separation between the users would be two or higher depending upon the number of users that are traversed to connect the two users. Generally, receiving users who are more closely connected, i.e., a lower degree of separation, to the purchasing user will be considered to be more likely to purchase credits than users who have a higher degree of separation.

The prediction may also be based on the history of the receiving user with respect to application use, digital purchases, and digital currencies. For example, users who have had more experience with applications associated with the social networking system 130 are considered to be more likely to purchase credits for digital items related to those applications than users who have less experience. Experience in this regard may take the form of time spent using the application, degree of achievement towards progress markers indicated in the applications (e.g., trophies achieved in a video game), or other metrics. Users who have purchased digital items are considered more likely to purchase digital items in the future than users who have not, and similarly users who have purchased more digital items are considered more likely to purchase even more digital items in the future than users who have purchased fewer items. Users who have purchased digital currencies are considered more likely to purchase more digital currency in the future than users who have used only real-world currency to purchase items. Users who have purchased items using digital currencies they themselves purchased are considered more likely to purchase digital items than users who have purchased items using digital currencies awarded to them for free, for example as a result of time spent using the applications.

In one embodiment, the predictions may be made by training a machine learning algorithm to take as inputs several different signals, including the history of the receiving user with respect to application use, digital purchases, and digital currencies. The machine learning algorithm could also incorporate these signals from other users of the social networking system to increase the robustness of the machine learning algorithm's determinations. The machine learning algorithm could then be predicted to provide a prediction regarding the receiving user's likelihood of buying additional credits if they were awarded bonus credits.

Based on the prediction, the social networking system 130 selects one or more of the other users who are predicted as likely to buy additional credits if they were awarded bonus credits. The social networking system 130 then provides 440 the purchasing user with a list of the one or more users as potential recipients of bonus credits. The purchasing user may then choose to reward any of the provided users with bonus credits.

The bonus credits provided are in addition to any credits the user has already purchased. In one embodiment, the total number of bonus credits is divided by the user at their behest to reward to the provided users. In another embodiment, the user chooses which of the selected users to reward with bonus credits, and each rewarded user receiving the bonus credits receives the same number of bonus credits.

Digital Item Sales Aggregation

By storing and aggregating digital item transaction information, the social networking system 130 can provide a user with up to date information about what kinds of digital items other users of the social networking system are purchasing. The sales data is anonymous in that it represents the aggregated purchase preferences of groups of users rather than individual users. The sales information provided may also be customized to the user's individual interests.

Figure 5:
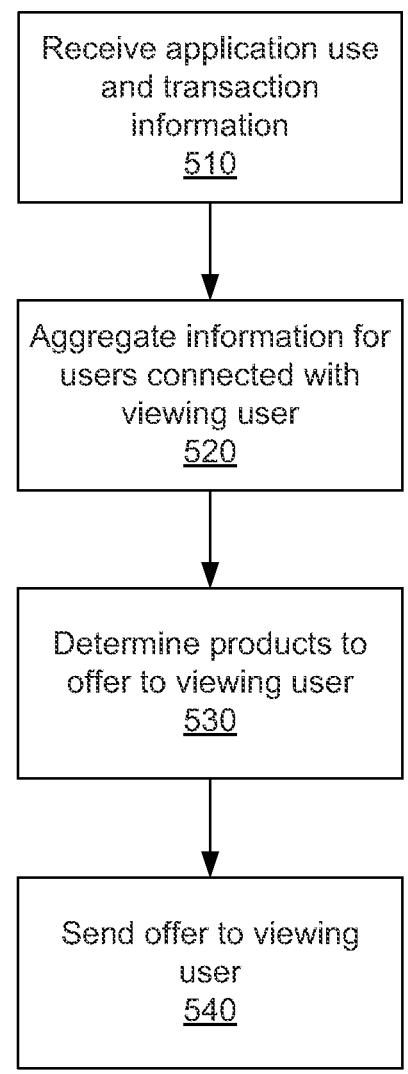
FIG. 5 is a flowchart of a process for providing a user with information regarding digital items that other users of the social networking system have purchased, according to one embodiment.

FIG. 5 is a flowchart for providing a user with information regarding digital items that other users of the social networking system have purchased, according to one embodiment. As above, as users of the social networking system make use of the applications associated with it, the social networking system receives and stores 510 sales information regarding the user's interactions and transactions regarding the application. With regard to digital item transactions, the social networking system 130 stores information regarding the price paid for a digital item, the aggregate sales of the digital item, the purchaser of the digital item, and the seller of the digital item.

In order to provide a viewing user of the social networking system with digital item purchase information, the social networking system 130 aggregates 520 the stored sales information. The information that is aggregated to determine what is provided to the user may vary. In one embodiment, the social networking system 130 aggregates 520 sales information for users who are connected with the viewing user through the social networking system 130. In this case, the viewing user is provided with sales information about items that their friends have purchased. The information that is aggregated 520 may include all friends of the viewing user connected directly through the social networking system 130, or it may also include friends of friends of the user, indirectly connected with the viewing user, or even friends of friends of friends, and so on, who are even more indirectly connected with the viewing user through the social networking system 130.

Alternatively, the users for which sales information is aggregated 520 may be based on other information associated with the viewing user's profile. In one embodiment, the sales data is aggregated 520 based on demographic information present in the viewing user's profile. For example, if the viewing user's profile indicates that the user lives in the United States, or in California particularly, the social networking system 130 may aggregate 520 sales data for users in the United States, or more specifically California. Any detail provided in the user profile may serve as a criteria upon which to aggregate including, for example, the viewing user's interests, the viewing user's use of applications associated with the social networking system, employment, family connections, and their educational institutions.

The social networking system processes the aggregated sales data to determine a digital item of interest for which to provide the viewing user with sales information. A digital item may be of interest if its aggregated sales is higher than for other items detected in the aggregation, if a new seller is offering a particular digital item, or if the digital item has decreased in relative price over a period of time. Other conditions are also envisioned to trigger the determination that a particular item is of interest.

In one embodiment, the determination of whether an item is of interest to a viewing user is based on the viewing user's history of application use, digital currency purchases, and digital item purchases. For example, if the user's application indicates a preference for using a particular application, the determination of whether a digital item is of interest may take into account the viewing user's revealed preference for that application. If the viewing user's digital item purchase history indicates that the user predominantly purchases digital items for a particular application, the determination of whether a digital item is of interest may take into account the viewing user's revealed preference for buying digital items that may be used in that particular application.

Responsive to determining a digital item of interest, the social networking system 130 provides 540 the viewing user with sales information related to the digital item of interest. The sales information may include a name of the digital item and purchasing information for the digital item including a prices of the item for various sellers. The sales information may also include aggregate sales information, for example aggregate price information so that the viewing user may discern whether or not it is a good time to buy the digital item based on historical price information.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a transaction request from a user of a social networking system to initiate a transaction to purchase an item for use in an application interfacing with the social networking system;
obtaining transaction information for the user from the social networking system, the transaction information comprising purchase data for application-related digital items purchased by the user from a plurality of applications interfacing with the social networking system, each digital item being specific to an application from the plurality of applications and related to a feature or item in the application;
determining the user's experience with digital item transactions based on the obtained transaction information for the user from a set of applications from the plurality of applications;
determining, by a computer processor, a transaction flow from a plurality of different transaction flows comprising differing interactions requesting user input to complete the transaction, the determined transaction flow based on the user's experience with digital item transactions; and
communicating with the social networking system to conduct the transaction using the determined transaction flow.

2. The method of claim 1, wherein determining the user's experience comprises receiving an indication of the user's experience from the social networking system.

3. The method of claim 1, wherein the transaction information comprises information regarding the user's purchases of digital currency.

4. The method of claim 1, wherein the transaction information comprises purchase data for application related digital items purchased using digital currency.

5. The method of claim 1 wherein determining the user's experience with digital item transactions comprises determining a user is competent if the transaction information indicates that the user has already completed at least one digital transaction for digital currency or digital items.

6. The method of claim 1 wherein determining the user's experience with digital item transactions comprises determining a user is not competent if the transaction information indicates that the user has not already completed at least one digital transaction for digital currency or digital items.

7. The method of claim 1, wherein a first transaction flow in the plurality of transaction flows comprises an expedited transaction flow that completes the transaction without user input.

8. The method of claim 1, wherein a first transaction flow in the plurality of transaction flows comprises an expedited transaction flow that displays a cost of a digital item in digital currency more prominently than in real-world currency.

9. The method of claim 1, wherein a second transaction flow in the plurality of transaction flows comprises an explanatory transaction flow that completes the transaction responsive to receiving a confirmation from the user.

10. The method of claim 1, wherein a second transaction flow in the plurality of transaction flows comprises an explanatory transaction flow that provides the user explanatory material explaining digital currencies or digital item transactions.

11. The method of claim 1 comprising sending the user a receipt responsive to the transaction being processed.

12. A computer program product comprising a non-transitory computer-readable storage medium having code encoded thereon:
   instructions that when executed by a processor, cause the processor to:
   receive a transaction request from a user of a social networking system to initiate a transaction to purchase an item for use in an application interfacing with the social networking system;
   obtain transaction information for the user from the social networking system, the transaction information comprising purchase data for application-related digital items purchased by the user from a plurality of applications interfacing with the social networking system, each digital item being specific to an application from the plurality of applications and related to a feature or item in the application;
   determine the user's experience with digital item transactions based on the obtained transaction information for the user from a set of applications from the plurality of applications;
   determine a transaction flow from a plurality of different transaction flows comprising differing interactions requesting user input to complete the transaction, the determined transaction flow based on the user's experience with digital item transactions; and
   communicate with the social networking system to conduct the transaction using the determined transaction flow.

13. The computer program product of claim 12, wherein determining the user's experience comprises receiving an indication of the user's experience from the social networking system.

14. The computer program product of claim 12, wherein the transaction information comprises information regarding the user's purchases of digital currency.

15. The computer program product of claim 12, wherein the transaction information comprises purchase data for application related digital items purchased using digital currency.

16. The computer program product of claim 12 wherein determining the user's experience with digital item transactions comprises determining a user is competent if the transaction information indicates that the user has already completed at least one digital transaction for digital currency or digital items.

17. The computer program product of claim 12 wherein determining the user's experience with digital item transactions comprises determining a user is not competent if the transaction information indicates that the user has not already completed at least one digital transaction for digital currency or digital items.

18. The computer program product of claim 12, wherein a first transaction flow in the plurality of transaction flows comprises an expedited transaction flow that completes the transaction without user input.

19. The computer program product of claim 12 wherein a first transaction flow in the plurality of transaction flows comprises an expedited transaction flow that displays a cost of a digital item in digital currency more prominently than in real-world currency.

20. The computer program product of claim 12, wherein a second transaction flow in the plurality of transaction flows comprises an explanatory transaction flow that completes the transaction responsive to receiving a confirmation from the user.

21. The computer program product of claim 12, wherein a second transaction flow in the plurality of transaction flows comprises an explanatory transaction flow that provides the user explanatory material explaining digital currencies or digital item transactions.

22. The computer program product of claim 12 comprising sending the user a receipt responsive to the transaction being processed.

* * * * *